(12) United States Patent
Lang et al.

(10) Patent No.: US 6,390,631 B1
(45) Date of Patent: May 21, 2002

(54) SYSTEM FOR AUTOMATIC ADJUSTMENT OF EXTERNAL MIRRORS FOR MOTOR VEHICLES WHEN DRIVING IN CURVES

(75) Inventors: Heinrich Lang, Ergersheim; Christopher Renner, Ipsheim, both of (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/307,947

(22) Filed: May 10, 1999

(30) Foreign Application Priority Data

May 2, 1999 (DE) ............................ 199 04 778

(51) Int. Cl.[7] ................................. G02B 5/08
(52) U.S. Cl. .................. 359/843; 359/214; 359/871; 359/872; 307/10.1
(58) Field of Search .................. 359/214, 841, 359/843, 846, 871, 872, 838; 307/10.1

(56) References Cited

U.S. PATENT DOCUMENTS

| | | |
|---|---|---|
| 1,430,379 A | 9/1922 | Hubbell |
| 1,848,064 A | 3/1932 | Oishei |
| 2,783,015 A | 2/1957 | Kampa |
| 3,107,077 A | 10/1963 | Lassa |
| 3,189,309 A | 6/1965 | Hager |
| 3,339,876 A | 9/1967 | Kampa |
| 3,346,229 A | 10/1967 | Carson, Jr. |
| 3,352,580 A | 11/1967 | Kurz et al. |
| 3,476,464 A | 11/1969 | Clark |
| 3,609,014 A | 9/1971 | Kurz, Jr. |
| 3,671,005 A | 6/1972 | Schultz |
| 3,761,164 A | 9/1973 | McKee et al. |
| 3,784,149 A | 1/1974 | Brudy |
| 3,936,158 A | 2/1976 | Cianciolo et al. |
| 3,950,080 A | 4/1976 | Yamashita et al. |
| 4,174,823 A | 11/1979 | Sutton et al. |
| 4,197,762 A | 4/1980 | Yamana |
| 4,281,899 A | 8/1981 | Oskam |
| 4,349,247 A | 9/1982 | Koyama et al. |
| 4,422,724 A | 12/1983 | Otsuka et al. |
| 4,456,333 A | 6/1984 | Hewitt |
| 4,555,166 A | 11/1985 | Enomoto |
| 4,609,265 A | 9/1986 | McKee et al. |
| 4,623,115 A | 11/1986 | Brester |
| 4,626,063 A * | 12/1986 | Honey ........................ 350/6.9 |
| 4,678,295 A | 7/1987 | Fisher |
| 4,679,158 A * | 7/1987 | Tate ........................... 364/559 |
| 4,693,571 A | 9/1987 | Kimura et al. |
| 4,696,555 A | 9/1987 | Enomoto |
| 4,701,037 A | 10/1987 | Bramer |
| 4,740,068 A | 4/1988 | Fisher |
| 4,764,002 A * | 8/1988 | Wilson ........................ 350/486 |

(List continued on next page.)

FOREIGN PATENT DOCUMENTS

| | | |
|---|---|---|
| WO | 9523079 | 8/1995 |
| WO | PCT WO 9523079 | 8/1995 |

*Primary Examiner*—Cassandra Spyrou
*Assistant Examiner*—Craig Curtis
(74) *Attorney, Agent, or Firm*—Dority & Manning, P.A.

(57) ABSTRACT

Described is a system for the automatic adjustment of external mirrors when driving in curves by vehicles, in particular commercial vehicles with a tow, tractor-trailers, articulated buses and the like. This system possesses a sensor for the detection of turning of the vehicle about a vertical axis, a control apparatus which is connected to said sensor and one electromotive mirror adjustment apparatus connected with the control apparatus for the tracking of the external mirror above a zero point corresponding to the turning of the vehicle about its vertical axis. The sensor for the detection of the turning movement of the vehicle about its vertical axis is, in this application, a turn-rate sensor based on gyroscopic principles.

18 Claims, 2 Drawing Sheets

U.S. PATENT DOCUMENTS

| | | | |
|---|---|---|---|
| 4,787,726 A | 11/1988 | Hendricks | |
| 4,818,090 A | 4/1989 | Righi | |
| 4,877,214 A | 10/1989 | Toshiaki et al. | |
| 4,877,319 A | 10/1989 | Mittelhauser | |
| 4,915,493 A | 4/1990 | Fisher et al. | |
| 4,938,577 A | 7/1990 | Sugita | |
| 4,957,359 A | 9/1990 | Kruse et al. | |
| 4,991,814 A | 2/1991 | Schmidt et al. | |
| 4,991,950 A | 2/1991 | Lang et al. | |
| 5,056,905 A | 10/1991 | Jensen | |
| 5,074,653 A | 12/1991 | Mittelhauser | |
| 5,081,546 A | 1/1992 | Bottrill | |
| 5,110,196 A | 5/1992 | Lang et al. | |
| 5,115,352 A | 5/1992 | do Espirito Santo | |
| 5,126,885 A * | 6/1992 | Gray | 359/841 |
| 5,132,851 A | 7/1992 | Bomar et al. | |
| 5,137,247 A | 8/1992 | Lang et al. | |
| 5,196,965 A | 3/1993 | Lang et al. | |
| 5,210,652 A | 5/1993 | Perkinson | |
| 5,225,943 A | 7/1993 | Lupo | |
| 5,227,924 A | 7/1993 | Kerper | |
| 5,249,083 A | 9/1993 | Doughtie et al. | |
| 5,268,619 A | 12/1993 | Vecchiarino | |
| 5,268,796 A | 12/1993 | Tomerlin et al. | |
| 5,306,953 A * | 4/1994 | Weiner | 307/10.1 |
| 5,337,190 A | 8/1994 | Kogita et al. | |
| 5,363,245 A | 11/1994 | Borello | |
| 5,363,246 A | 11/1994 | Perry et al. | |
| 5,432,640 A | 7/1995 | Gilbert et al. | |
| 5,436,769 A | 7/1995 | Gilbert et al. | |
| 5,467,230 A | 11/1995 | Boddy et al. | |
| 5,477,390 A | 12/1995 | Boddy et al. | |
| 5,477,391 A | 12/1995 | Boddy | |
| 5,483,385 A | 1/1996 | Boddy | |
| 5,497,275 A | 3/1996 | Perry et al. | |
| 5,523,811 A | 6/1996 | Wada et al. | |
| 5,566,030 A | 10/1996 | Yue | |
| 5,568,326 A | 10/1996 | Yoshida et al. | |
| 5,615,054 A | 3/1997 | Lang et al. | |
| 5,621,577 A | 4/1997 | Lang et al. | |
| 5,625,502 A | 4/1997 | Hoogenboom et al. | |
| 5,627,688 A | 5/1997 | Valentino | |
| 5,642,106 A * | 6/1997 | Hancock et al. | 340/988 |
| 5,657,174 A | 8/1997 | Boddy | |
| 5,687,035 A | 11/1997 | Lang | |
| 5,687,646 A | 11/1997 | Boddy | |
| 5,703,731 A | 12/1997 | Boddy et al. | |
| 5,703,732 A | 12/1997 | Boddy et al. | |
| 5,726,816 A | 3/1998 | Gordon | |
| 5,760,980 A | 6/1998 | Lang | |
| 5,786,772 A | 7/1998 | Schofield et al. | |
| 5,788,357 A | 8/1998 | Muth et al. | |
| 5,798,882 A | 8/1998 | Lang | |
| 5,815,302 A * | 9/1998 | McVey et al. | 359/214 |
| 5,844,733 A | 12/1998 | Ravanini | |
| 5,889,627 A | 3/1999 | Englander et al. | |
| 5,896,235 A | 4/1999 | Valentino | |
| 5,914,824 A | 6/1999 | Valentino | |
| 5,938,166 A | 8/1999 | Seichter et al. | |
| 5,953,167 A | 9/1999 | Valentino | |
| 5,953,168 A | 9/1999 | Valentino | |
| 6,174,062 B1 | 1/2001 | Schillegger et al. | |

* cited by examiner

SYSTEM FOR AUTOMATIC ADJUSTMENT OF EXTERNAL MIRRORS FOR MOTOR VEHICLES WHEN DRIVING IN CURVES

The invention is concerned with a system for automatic adjustment to external mirrors when driving in curves in accord with claim 1 and the invention is additionally concerned with an external mirror with a system of the above type in accord with claim 15.

In the case of driving through curves with vehicles, especially in the case of commercial vehicles with a tow, tractor-trailers, articulated buses and the like, in the inside of the curve the line of sight is limited due to the bending of the vehicle combination. This often leads to deadly accidents involving pedestrians and bicycle riders, who are found on the inside of the curve and are not seen by the driver because of the said limitations of sight as the vehicle turns. In order to avoid this problem, systems are already in common knowledge, in which the mirror on the inside of the curve adjusts itself automatically to correspond to the turning motion. This is done so that the visible area is held over the entire length of the vehicle, all the way to the end.

From WO-A-95 23079, such a system has been made known, in which, where tractor-trailers are concerned in the curve driving, the changing differential in distance between the tractor and the trailer is determined by means of ultrasonic sensors. From this changing differential of distance, as progress is made around the curve, that is, the bending of the tractor in relation to the trailer, a signal to cause the mirror to track the inside curve is achieved. Another similar system based on ultrasonics is made known by the U.S. Pat. No. 5,306,953 and the U.S. Pat. No. 5,132,851.

From the said WO-A-95 23079, the practice is known of installing a magnetic field sensor on the tractor as well as on the trailer, however, like a magnetic compass, both sensors do react to the magnetic field of the earth.

From the difference in signals from the two magnetic field sensors, a signal for the turning of the vehicle around its vertical axis is arrived at. The use of magnetic sensors leads, in any case, to problems, since because of the multitude of electrical operators in a vehicle, some having substantial current demands—because of the low voltage—large magnetic fields arise, which disturb the functioning of the magnetic field sensors.

Setting out from the WO-A-95 23079, it is therefore a purpose of the present invention, to make available a system for the automatic adjustment of external mirrors of vehicles, during driving in curves, especially in the case of commercial vehicles with a tow and tractor-trailers, which system operates reliably and is adaptable even for the most different vehicles. Besides this, it is another purpose of the present invention to present a combination of a system of this type combined with a conventional external mirror for commercial vehicles. The achievement of these purposes is brought about by the features of the claims 1 and 15.

Because of the fact, that the turning motion of the vehicle about its vertical axis can be determined by a turn-rate sensor operating on the principle of a gyroscope, the functioning of the tracking system cannot be impaired by, for instance, contaminations, such as invariably enter in the case of commercial vehicles nor by magnetic fields due to the electrical usage in the vehicle. Thereby, it becomes possible, to install the turn-rate sensor at an optional point in the vehicle and especially is it possible, to integrate the turn-rate sensor into a conventional external mirror, so that the automated, tracking external mirror is made as a total system and can be sold as such.

In accord with an advantageous embodiment of the invention, the mirror adjustment apparatus of the tracking system is the electro-magnetic mirror adjustment system of a conventional external rear view mirror, so that any additional components are avoided.

In accord with an advantageous development of the invention, the adjustment of the external mirror is made continually in accord with the sensor measured turning of the vehicle about the vertical axis. In this way backward mirror movements, which could irritate the driver are avoided.

In accord with a further advantageous embodiment of the invention, the travel speed of the vehicle is taken into consideration as an input to the tracking of the mirror. That is, at a greater driving speed, the adjustment is effected more rapidly than at lower driving speeds. Thereby, the method of functioning of the system in accord with the present invention in various speed ranges is assured. An adjustment which is too slow or too rapid, that is, the tracking movement of the external mirror is thereby avoided.

In accord with another advantageous embodiment of the invention, the tracking movement during curve driving is done only in a definite speed range between a minimal speed and a maximum speed. Thereby, the mirror does not move at all during truck park maneuvering, which is done with very low speeds, thus avoiding irritation on the part of the driver.

In accord with an advantageous development, the speed of the vehicle is determined by direct branching from an existing speed signal which is normally found in vehicles, which signal is diverted to the control device. An additional speed sensor is superfluous.

In accord with a further, advantageous embodiment, the speed of the vehicle, with which the external mirror is adjusted, corresponds to, i.e. is proportional to the turning speed of the vehicle about its vertical axis. On this account, the evaluation of a driving speed becomes superfluous.

In accord with a further advantageous embodiment of the invention, the tracking of the external mirror corresponds to the determined rate of turning between a zero-point and a maximum allowable angle in two opposite turning directions. Then the sensor detects a turning about a vertical axis upon the beginning of a curve, then the deflection of the external mirror is to the outside, and if the sensor detects, that the vehicle again resumes a directly forward movement, then the external mirror is reset in the opposite direction to the zero-point.

Alternatively, it is also possible, with a simple embodiment of the invention, to bring about a situation in which the adjustment of the external mirrors during curve driving, as determined by the detected degree of turn, is effected in only one direction and the subsequent resetting into a zero position occurs automatically after a certain length of time. This length of time, or said duration, when this system is used, can be definitely fixed, or it can align itself in accord with the vehicle speed or the rate of turn within the curved driving.

In accord with a further advantageous embodiment of the present invention, the system for tracking is subject to manual disconnection. This is of advantage in the course of maneuvering or if the driver feels himself irritated by the automatic tracking.

In accord with a further especially advantageous embodiment of the invention, the turn rate sensor for tractor trailers is installed in the cab. In this case, in the trailer itself no components of the invented tracking system have been provided. This would make sure, that optional trailers can be employed, since the system is exclusively situated in the cab. In the matter of mirror adjustment, it is of especial value when the tracking system is integrated in a conventional external mirror installation with electromotive control possibilities. In this case, the external mirror, complete with automatic tracking can be offered as a complete system. The remaining subordinate claims concern themselves with further advantageous embodiments of the invention.

Further details, features and advantages of the invention are evident in the following description of an example embodiment of the invention, made with the aid of drawings. There is shown in.

Figure 1:
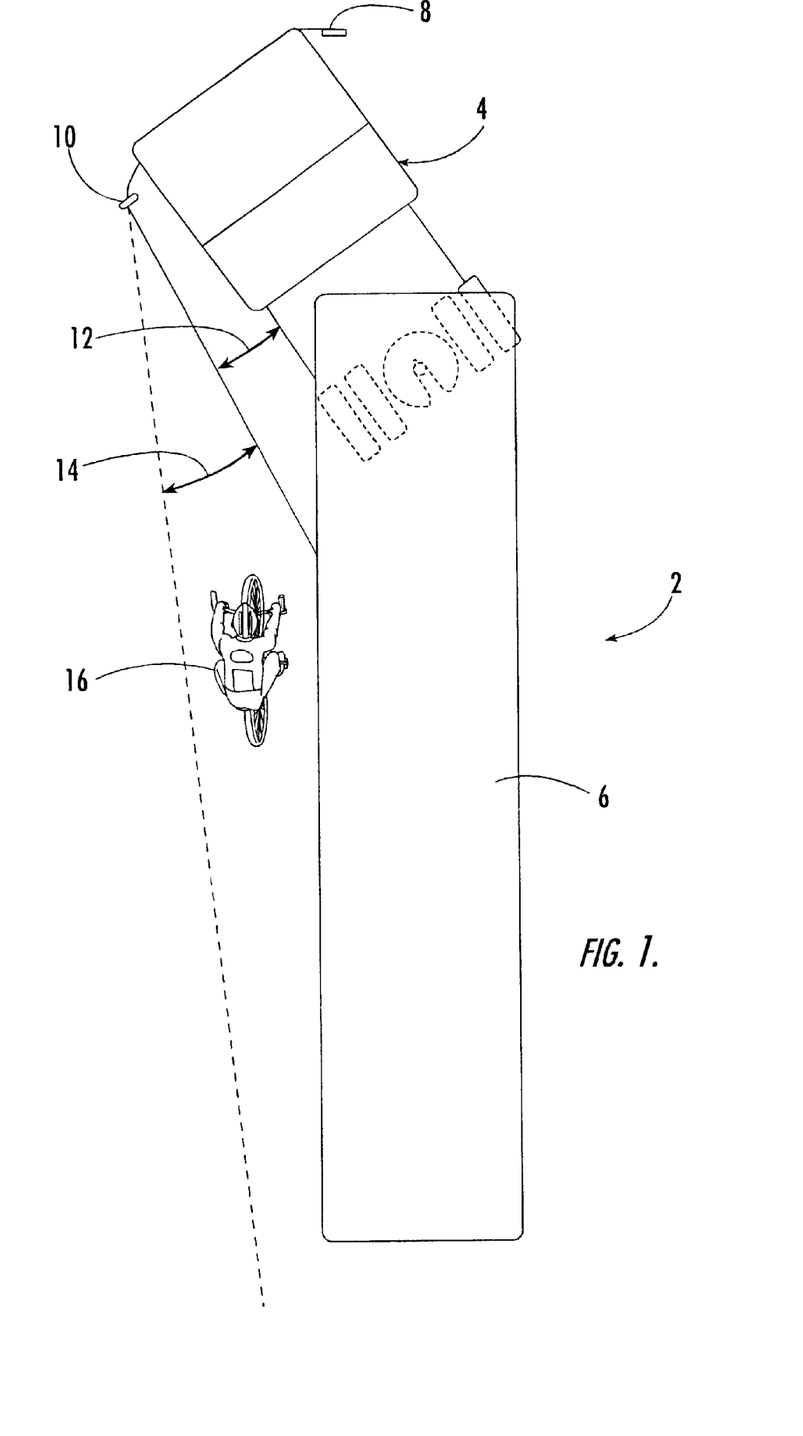
FIG. 1 a schematic presentation for the explanation of the fundamental principles of an automatically controlled, tracking mirror in curved driving, FIG. 2 a block, interconnection diagram of an example embodiment of the present invention and FIG. 3 a schematic presentation of the integration of the system of the invention into an external mirror for commercial vehicles.

FIG. 1 shows a tractor-trailer 2, which is comprised of a tractor 4 and a trailer 6 in the course of a left turn at an intersection, that is to say, upon making a left turn. On the tractor 4, schematically, a right side external mirror 8 is shown, which is on the outside of the curve. Also so shown, is a left side external mirror 10 on the inside of the curve. The mirror 10 on the inside of the curve is automatically adjusted and tracks accordingly by the invented system in the movement through the curve. With the reference number 12, the limited visible area of the external mirror 10 is illustrated without tracking. Reference number 14 indicates the widened visible area of an external mirror 10 equipped with tracking facilities. Also, FIG. 1 makes evident, that the expanded area of vision 14, representing that of the external, tracking mirror 10, which is on the inside of the curve, allows the pedestrian or bicycle rider 16 to be seen by the driver of the tractor trailer in that same tracking mirror 10, which is on the inside of the curve. On the other hand, the pedestrian or bicycle rider 16, in the case of a mirror without tracking facilities, finds himself in the limited field of vision 12 and is not seen. The external mirror 8 on the outside of the curve is customarily not automatically adjusted, since, as can be seen in FIG. 1, the rear end of the vehicle 2, that is, the end of the trailer 6, cannot be seen.

Figure 2:
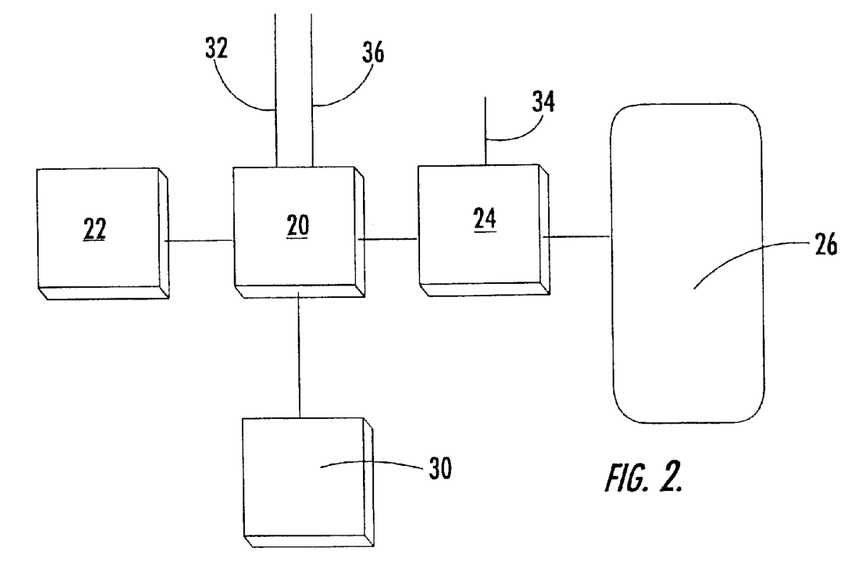

FIG. 2 shows a schematic wiring diagram in block style of an example embodiment of the invention. This system, which is in accord with the invention, is comprised of: a control apparatus 20 in the form of a microprocessor or micro-controller, a gyroscopic turn-rate sensor 22, connected with control 20 and an electromotively operated mirror adjustment device 24 connected with control apparatus 20, by which a mirror pane 26 of the inside curve, external mirror 10 can be adjusted.

A service module 30 is likewise connected with the control apparatus 20. By means of the service module 30, the invented system can be manually turned off or on.

Besides this, by means of the service module 30, certain parameters of the invented system can be set, such as maximum outward travel, that is, the maximum outer adjustment limit of the external mirror 10, sensitivity of the system, the latter being at the point of minimal angle of turning, where the system will activate, and automatic reset time—and the like.

Furthermore, by means of the service module 30, some constant settings of the external mirror 10 can be defined or set in operation, in one instance, three different positionings in which the external mirror 10 can be run. To which of these positionings the mirror might be run can be made dependent on the turning motion of the vehicle.

The connection of the control apparatus 20 with a (not more closely described) source of electrical current is indicated by reference number 32. This will be the current source of the individual vehicle. The reference number 34 indicates the current supply for the mirror adjustment apparatus 24. The reference number 36 shows the feed of an input speed-signal to the control apparatus 20 which is drawn from the tachometer of the respective vehicle.

In the case of the turn-rate sensor 22, this is a gyroscopic-sensor, as it customarily is employed in video cameras, in order to avoid shaky pictures. Such sensors are, for instance, offered by the firm Wuntronic GmbH in Munich, Germany and are sold there.

Figure 3:
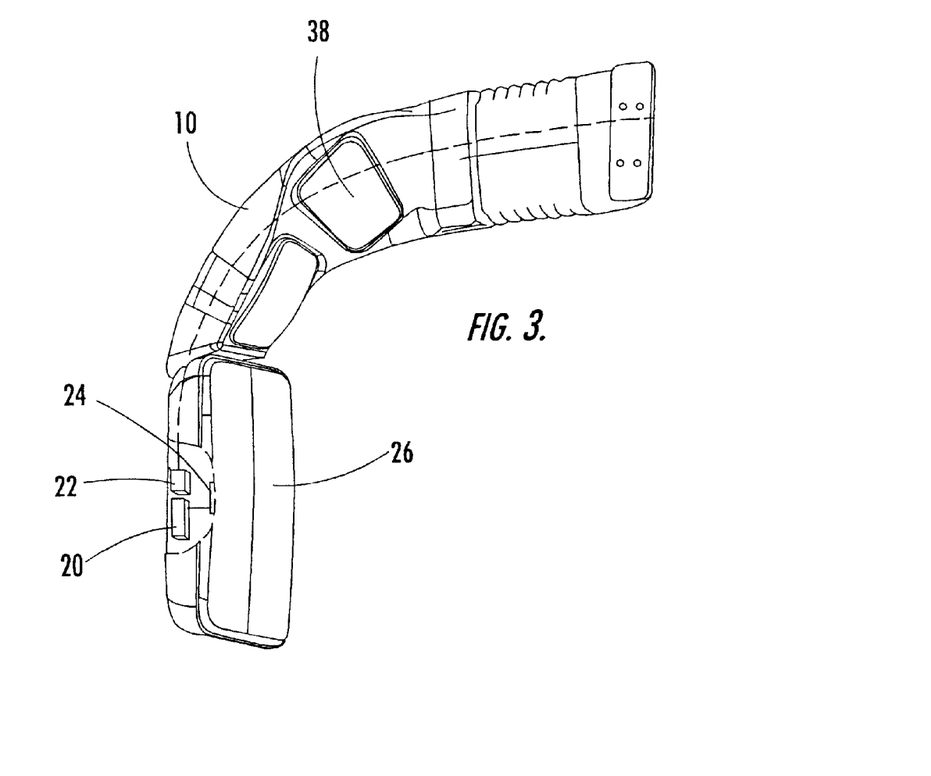

FIG. 3 shows in schematic style, the tractor 4 with the left external mirror 10 and the therein integrated components of the system in accord with the invention. Turn-rate sensor 22, control apparatus 20 and the mirror adjustment device 24 are all integrally packaged into the mirror housing of the external mirror 10. By means of a cable 38, the connection is made to the internal cab of the tractor 4 for the supply of current and to the service module 30.

Advantageously, the mirror tracking system operates not only for forward motion, but also for the backing up of the vehicle.

What is claimed is:

1. A system for automatically adjusting an external rear-view mirror mounted on a vehicle, the system comprising:
   a gyroscopic turn-rate sensor mounted to the vehicle for generating a vehicle turn-rate signal responsive to a turn made by the vehicle;
   a control apparatus mounted to the vehicle, in communication with said turn-rate sensor, said control apparatus generating a mirror pivoting signal responsive to said vehicle turn-rate signal; and
   an electromotively activated mirror adjustment apparatus mounted to the vehicle and in communication with said control apparatus, said adjustment apparatus pivoting the external mirror between a zero position and a turn position responsive to said mirror pivoting signal.

2. A system in accord with claim 1, wherein said control apparatus generates said mirror pivoting signal so as to pivot said mirror continuously during a vehicle turn.

3. A system in accord with claim 1, wherein said control apparatus generates said mirror pivoting signal so as to pivot said mirror in discrete steps during a vehicle turn.

4. A system in accord with claim 1, wherein said control apparatus generates said vehicle pivoting signal regardless of whether the vehicle is traveling forward or backward.

5. A system in accord with claim 1, further including a vehicle speed sensor for generating a vehicle speed signal responsive to the speed of the vehicle, said control apparatus generating said mirror pivoting signal responsive to said vehicle speed signal.

6. A system in accord with claim 1, further including a temperature sensor for generating a temperature signal, said control apparatus generating said mirror pivoting signal responsive to said temperature signal.

7. A system in accord with claim 1, wherein said mirror pivoting signal causes said mirror to be reset to said zero position after a specified duration of time.

8. A system in accord with claim 1, wherein said system includes a control for manually switching the system on or off.

9. A system in accord with claim 1, wherein said turn-rate sensor is mounted in a mirror housing.

10. A system for automatically adjusting an external rearview mirror mounted on a vehicle, the system including:
   means for gyroscopically generating a vehicle turn-rate signal responsive to a turn made by the vehicle;
   means for generating a mirror pivoting signal responsive to said vehicle turn-rate signal; and
   means for pivoting the external mirror between a zero position and a turn position responsive to the mirror pivoting signal.

11. A system in accord with claim 10, wherein said control apparatus generates said mirror pivoting signal so as to pivot said mirror continuously during a vehicle turn.

12. A system in accord with claim 10, wherein said control apparatus generates said mirror pivoting signal so as to pivot said mirror in discrete steps during a vehicle turn.

13. A system in accord with claim 10, wherein said control apparatus generates said vehicle pivoting signal regardless of whether the vehicle is traveling forward or backward.

14. A system in accord with claim 10, further including a vehicle speed sensor for generating a vehicle speed signal responsive to the speed of the vehicle, said control apparatus generating said mirror pivoting signal responsive to said vehicle speed signal.

15. A system in accord with claim 10, further including a temperature sensor for generating a temperature signal, said control apparatus generating said mirror pivoting signal responsive to said temperature signal.

16. A system in accord with claim 10, wherein said mirror pivoting signal causes said mirror to be reset to said zero position after a specified duration of time.

17. A system for automatically adjusting an external rearview mirror, said system comprising:
   a mirror housing;
   a gyroscopic turn-rate sensor for generating a vehicle turn-rate signal responsive to a turn made by the vehicle, said turn-rate sensor being disposed in said mirror housing;
   a control apparatus in communication with said turn-rate sensor, said control apparatus generating a mirror pivoting signal responsive to said vehicle turn-rate signal, said control apparatus being disposed in said mirror housing; and
   an electromotively activated mirror adjustment apparatus mounted to said mirror housing and in communication with said control apparatus, said adjustment apparatus pivoting the external mirror between a zero position and a turn position responsive to said mirror pivoting signal.

18. A system in accord with claim 17, further including a mirror pane mounted to said adjustment apparatus.

* * * * *

UNITED STATES PATENT AND TRADEMARK OFFICE
CERTIFICATE OF CORRECTION

PATENT NO. : 6,390,631 B1
DATED : May 21, 2002
INVENTOR(S) : Heinrich Lang et al.

It is certified that error appears in the above-identified patent and that said Letters Patent is hereby corrected as shown below:

Columns 1-6 should be deleted to appear as per attached columns 1-6.

Signed and Sealed this

Fourteenth Day of March, 2006

JON W. DUDAS
*Director of the United States Patent and Trademark Office*

SYSTEM FOR AUTOMATIC ADJUSTMENT OF EXTERNAL MIRRORS FOR MOTOR VEHICLES WHEN DRIVING IN CURVES

The invention is concerned with a system for automatic adjustment to external mirrors when driving in curves in accord with claim 1 and the invention is additionally concerned with an external mirror with a system of the above type in accord with claim 15.

In the case of driving through curves with vehicles, especially in the case of commercial vehicles with a tow, tractor-trailers, articulated buses and the like, in the inside of the curve the line of sight is limited due to the bending of the vehicle combination. This often leads to deadly accidents involving pedestrians and bicycle riders, who are found on the inside of the curve and are not seen by the driver because of the said limitations of sight as the vehicle turns. In order to avoid this problem, systems are already in common knowledge, in which the mirror on the inside of the curve adjusts itself automatically to correspond to the turning motion. This is done so that the visible area is held over the entire length of the vehicle, all the way to the end.

From WO-A-95 23079, such a system has been made known, in which, where tractor-trailers are concerned in the curve driving, the changing differential in distance between the tractor and the trailer is determined by means of ultrasonic sensors. From this changing differential of distance, as progress is made around the curve, that is, the bending of the tractor in relation to the trailer, a signal to cause the mirror to track the inside curve is achieved. Another similar system based on ultrasonics is made known by the U.S. Pat. No. 5,306,953 and the U.S. Pat. No. 5,132,851.

From the said WO-A-95 23079, the practice is known of installing a magnetic field sensor on the tractor as well as on the trailer, however, like a magnetic compass, both sensors do react to the magnetic field of the earth.

From the difference in signals from the two magnetic field sensors, a signal for the turning of the vehicle around its vertical axis is arrived at. The use of magnetic sensors leads, in any case, to problems, since because of the multitude of electrical operators in a vehicle, some having substantial current demands—because of the low voltage—large magnetic fields arise, which disturb the functioning of the magnetic field sensors.

Setting out from the WO-A-95 23079, it is therefore a purpose of the present invention, to make available a system for the automatic adjustment of external mirrors of vehicles, during driving in curves, especially in the case of commercial vehicles with a tow and tractor-trailers, which system operates reliably and is adaptable even for the most different vehicles. Besides this, it is another purpose of the present invention to present a combination of a system of this type combined with a conventional external mirror for commercial vehicles. The achievement of these purposes is brought about by the features of the claims 1 and 15.

Because of the fact, that the turning motion of the vehicle about its vertical axis can be determined by a turn-rate sensor operating on the principle of a gyroscope, the functioning of the tracking system cannot be impaired by, for instance, contaminations, such as invariably enter in the case of commercial vehicles nor by magnetic fields due to the electrical usage in the vehicle. Thereby, it becomes possible, to install the turn-rate sensor at an optional point in the vehicle and especially is it possible, to integrate the turn-rate sensor into a conventional external mirror, so that the automated, tracking external mirror is made as a total system and can be sold as such.

In accord with an advantageous embodiment of the invention, the mirror adjustment apparatus of the tracking system is the electro-magnetic mirror adjustment system of a conventional external rear view mirror, so that any additional components are avoided.

In accord with an advantageous development of the invention, the adjustment of the external mirror is made continually in accord with the sensor measured turning of the vehicle about the vertical axis. In this way backward mirror movements, which could irritate the driver are avoided.

In accord with a further advantageous embodiment of the invention, the travel speed of the vehicle is taken into consideration as an input to the tracking of the mirror. That is, at a greater driving speed, the adjustment is effected more rapidly than at lower driving speeds. Thereby, the method of functioning of the system in accord with the present invention in various speed ranges is assured. An adjustment which is too slow or too rapid, that is, the tracking movement of the external mirror is thereby avoided.

In accord with another advantageous embodiment of the invention, the tracking movement during curve driving is done only in a definite speed range between a minimal speed and a maximum speed. Thereby, the mirror does not move at all during truck park maneuvering, which is done with very low speeds, thus avoiding irritation on the part of the driver.

In accord with an advantageous development, the speed of the vehicle is determined by direct branching from an existing speed signal which is normally found in vehicles, which signal is diverted to the control device. An additional speed sensor is superfluous.

In accord with a further, advantageous embodiment, the speed of the vehicle, with which the external mirror is adjusted, corresponds to, i.e. is proportional to the turning speed of the vehicle about its vertical axis. On this account, the evaluation of a driving speed becomes superfluous.

In accord with a further advantageous embodiment of the invention, the tracking of the external mirror corresponds to the determined rate of turning between a zero-point and a maximum allowable angle in two opposite turning directions. Then the sensor detects a turning about a vertical axis upon the beginning of a curve, then the deflection of the external mirror is to the outside, and if the sensor detects, that the vehicle again resumes a directly forward movement, then the external mirror is reset in the opposite direction to the zero-point.

Alternatively, it is also possible, with a simple embodiment of the invention, to bring about a situation in which the adjustment of the external mirrors during curve driving, as determined by the detected degree of turn, is effected in only one direction and the subsequent resetting into a zero position occurs automatically after a certain length of time. This length of time, or said duration, when this system is used, can be definitely fixed, or it can align itself in accord with the vehicle speed or the rate of turn within the curved driving.

In accord with a further advantageous embodiment of the present invention, the system for tracking is subject to manual disconnection. This is of advantage in the course of maneuvering or if the driver feels himself irritated by the automatic tracking.

In accord with a further especially advantageous embodiment of the invention, the turn rate sensor for tractor trailers is installed in the cab. In this case, in the trailer itself no components of the invented tracking system have been provided. This would make sure, that optional trailers can be employed, since the system is exclusively situated in the cab. In the matter of mirror adjustment, it is of especial value when the tracking system is integrated in a conventional external mirror installation with electromotive control possibilities. In this case, the external mirror, complete with automatic tracking can be offered as a complete system. The remaining subordinate claims concern themselves with further advantageous embodiments of the invention.

Further details, features and advantages of the invention are evident in the following description of an example embodiment of the invention, made with the aid of drawings. There is shown in:

FIG. 1 a schematic presentation for the explanation of the fundamental principles of an automatically controlled, tracking mirror in curved driving, FIG. 2 a block, interconnection diagram of an example embodiment of the present invention and FIG. 3 a schematic presentation of the integration of the system of the invention into an external mirror for commercial vehicles.

FIG. 1 shows a tractor-trailer 2, which is comprised of a tractor 4 and a trailer 6 in the course of a left turn at an intersection, that is to say, upon making a left turn. On the tractor 4, schematically, a right side external mirror 8 is shown, which is on the outside of the curve. Also so shown, is a left side external mirror 10 on the inside of the curve. The mirror 10 on the inside of the curve is automatically adjusted and tracks accordingly by the invented system in the movement through the curve. With the reference number 12, the limited visible area of the external mirror 10 is illustrated without tracking. Reference number 14 indicates the widened visible area of an external mirror 10 equipped with tracking facilities. Also, FIG. 1 makes evident, that the expanded area of vision 14, representing that of the external, tracking mirror 10, which is on the inside of the curve, allows the pedestrian or bicycle rider 16 to be seen by the driver of the tractor trailer in that same tracking mirror 10, which is on the inside of the curve. On the other hand, the pedestrian or bicycle rider 16, in the case of a mirror without tracking facilities, finds himself in the limited field of vision 12 and is not seen. The external mirror 8 on the outside of the curve is customarily not automatically adjusted, since, as can be seen in FIG. 1, the rear end of the vehicle 2, that is, the end of the trailer 6, cannot be seen.

FIG. 2 shows a schematic wiring diagram in block style of an example embodiment of the invention. This system, which is in accord with the invention, is comprised of: a control apparatus 20 in the form of a microprocessor or micro-controller, a gyroscopic turn-rate sensor 22, connected with control 20 and an electromotively operated mirror adjustment device 24 connected with control apparatus 20, by which a mirror pane 26 of the inside curve, external mirror 10 can be adjusted.

A service module 30 is likewise connected with the control apparatus 20. By means of the service module 30, the invented system can be manually turned off or on.

Besides this, by means of the service module 30, certain parameters of the invented system can be set, such as maximum outward travel, that is, the maximum outer adjustment limit of the external mirror 10, sensitivity of the system, the latter being at the point of minimal angle of turning, where the system will activate, and automatic reset time—and the like.

Furthermore, by means of the service module 30, some constant settings of the external mirror 10 can be defined or set in operation, in one instance, three different positionings in which the external mirror 10 can be run. To which of these positionings the mirror might be run can be made dependent on the turning motion of the vehicle.

The connection of the control apparatus 20 with a (not more closely described) source of electrical current is indicated by reference number 32. This will be the current source of the individual vehicle. The reference number 34 indicates the current supply for the mirror adjustment apparatus 24. The reference number 36 shows the feed of an input speed-signal to the control apparatus 20 which is drawn from the tachometer of the respective vehicle.

In the case of the turn-rate sensor 22, this is a gyroscopic-sensor, as it customarily is employed in video cameras, in order to avoid shaky pictures. Such sensors are, for instance, offered by the firm Wuntronic GmbH in Munich, Germany and are sold there.

FIG. 3 shows in schematic style, the tractor 4 with the left external mirror 10 and the therein integrated components of the system in accord with the invention. Turn-rate sensor 22, control apparatus 20 and the mirror adjustment device 24 are all integrally packaged into the mirror housing of the external mirror 10. By means of a cable 38, the connection is made to the internal cab of the tractor 4 for the supply of current and to the service module 30.

Advantageously, the mirror tracking system operates not only for forward motion, but also for the backing up of the vehicle.

What is claimed is:

1. A system for automatically adjusting an external rear-view mirror mounted on a vehicle, the system comprising:
   a gyroscopic turn-rate sensor mounted to the vehicle for generating a vehicle turn-rate signal responsive to a turn made by the vehicle;
   a control apparatus mounted to the vehicle, in communication with said turn-rate sensor, said control apparatus generating a mirror pivoting signal responsive to said vehicle turn-rate signal; and
   an electromotively activated mirror adjustment apparatus mounted to the vehicle and in communication with said control apparatus, said adjustment apparatus pivoting the external mirror between a zero position and a turn position responsive to said mirror pivoting signal.

2. A system in accord with claim 1, wherein said control apparatus generates said mirror pivoting signal so as to pivot said mirror continuously during a vehicle turn.

3. A system in accord with claim 1, wherein said control apparatus generates said mirror pivoting signal so as to pivot said mirror in discrete steps during a vehicle turn.

4. A system in accord with claim 1, wherein said control apparatus generates said vehicle pivoting signal regardless of whether the vehicle is traveling forward or backward.

5. A system in accord with claim 1, further including a vehicle speed sensor for generating a vehicle speed signal responsive to the speed of the vehicle, said control apparatus generating said mirror pivoting signal responsive to said vehicle speed signal.

6. A system in accord with claim 1, further including a temperature sensor for generating a temperature signal, said control apparatus generating said mirror pivoting signal responsive to said temperature signal.

7. A system in accord with claim 1, wherein said mirror pivoting signal causes said mirror to be reset to said zero position after a specified duration of time.

8. A system in accord with claim 1, wherein said system includes a control for manually switching the system on or off.

9. A system in accord with claim 1, wherein said turn-rate sensor is mounted in a mirror housing.

10. A system for automatically adjusting an external rearview mirror mounted on a vehicle, the system including:
   means for gyroscopically generating a vehicle turn-rate signal responsive to a turn made by the vehicle;
   means for generating a mirror pivoting signal responsive to said vehicle turn-rate signal; and
   means for pivoting the external mirror between a zero position and a turn position responsive to the mirror pivoting signal.

11. A system in accord with claim 10, wherein said control apparatus generates said mirror pivoting signal so as to pivot said mirror continuously during a vehicle turn.

12. A system in accord with claim 10, wherein said control apparatus generates said mirror pivoting signal so as to pivot said mirror in discrete steps during a vehicle turn.

13. A system in accord with claim 10, wherein said control apparatus generates said vehicle pivoting signal regardless of whether the vehicle is traveling forward or backward.

14. A system in accord with claim 10, further including a vehicle speed sensor for generating a vehicle speed signal responsive to the speed of the vehicle, said control apparatus generating said mirror pivoting signal responsive to said vehicle speed signal.

15. A system in accord with claim 10, further including a temperature sensor for generating a temperature signal, said control apparatus generating said mirror pivoting signal responsive to said temperature signal.

16. A system in accord with claim 10, wherein said mirror pivoting signal causes said mirror to be reset to said zero position after a specified duration of time.

17. A system for automatically adjusting an external rearview mirror, said system comprising:
   a mirror housing;
   a gyroscopic turn-rate sensor for generating a vehicle turn-rate signal responsive to a turn made by the vehicle, said turn-rate sensor being disposed in said mirror housing;
   a control apparatus in communication with said turn-rate sensor, said control apparatus generating a mirror pivoting signal responsive to said vehicle turn-rate signal, said control apparatus being disposed in said mirror housing; and
   an electromotively activated mirror adjustment apparatus mounted to said mirror housing and in communication with said control apparatus, said adjustment apparatus pivoting the external mirror between a zero position and a turn position responsive to said mirror pivoting signal.

18. A system in accord with claim 17, further including a mirror pane mounted to said adjustment apparatus.

* * * * *